United States Patent [19]

Laurenz

[11] 4,123,992
[45] Nov. 7, 1978

[54] CLEAN OUT SYSTEM FOR ANIMAL FACILITIES

[75] Inventor: Frank R. Laurenz, Eagle Butte, S. Dak.

[73] Assignee: Agricultural Research & Development, Inc., Eagle Butte, S. Dak.

[21] Appl. No.: 737,160

[22] Filed: Oct. 29, 1976

[51] Int. Cl.² .............................................. A01K 1/00
[52] U.S. Cl. ...................................... 119/16; 119/28
[58] Field of Search ........................... 119/16, 22, 28; 198/616, 550; 214/17 D

[56] References Cited

U.S. PATENT DOCUMENTS

| | | | |
|---|---|---|---|
| 2,383,326 | 8/1945 | Lovell | 119/22 |
| 3,021,819 | 2/1962 | Krahn | 119/28 X |
| 3,229,665 | 1/1966 | Baltz | 119/52 AF |
| 3,343,521 | 9/1967 | Moores | 119/28 X |
| 3,919,976 | 11/1975 | Meyer et al. | 119/16 |

FOREIGN PATENT DOCUMENTS 377,580  6/1964  Switzerland ............................ 119/28

Primary Examiner—Hugh R. Chamblee
Attorney, Agent, or Firm—Larson, Taylor and Hinds

[57] ABSTRACT

A circular area is provided having the floor sloping inwardly towards the center and having manure and urine disposal means within the center. A boom is pivotally mounted by one end thereof in the center and extends radially outwardly to the outer boundary of the area to be cleaned and a scraper component is supported by the boom and contacts the floor surface. The boom is operatively connected to a source of power for rotating same and the scraper is either straight or curved with the inner end secured at a point offset from the axis of the boom pivot so that when rotated, the outer end of the scraper is in advance of a radius line extending upwardly from the pivot and the inner end of the scraper is behind the same radius line extending from the pivot. An alternative embodiment provides a floor sloping outwardly from the central pivot to an annular sump or collector under which circumstances, the relation of the scraper is reversed. The scraper or the boom may be provided with floating mounting means to facilitate continuous contact with the floor surface. With the scraper crossing radius lines at an angle, in conjunction with the sloping floor surface, any debris or manure scraped from the floor surface is automatically urged towards the collecting sump. An alternative embodiment includes means mounted on the boom to spray water/disinfectant onto the floor as it is being scraped and cleaned.

27 Claims, 8 Drawing Figures

CLEAN OUT SYSTEM FOR ANIMAL FACILITIES

BACKGROUND OF THE INVENTION

This invention relates to new and useful improvements in animal facilities, particularly animal facilities such as barns and the like.

It is well known that a circular facility of this nature is particularly convenient and economical in construction and general maintenance, such facilities normally including annularly arranged stalls for the animals with a central area for watering and exercise and this central area is normally utilized by the animals for discharge of waste products such as manure and urine.

Some facilities are provided with a slotted or perforated floor for the waste products to fall through to a holding pit. However, these create undesirable odors and gases within the facility.

It is therefore desirable to remove manure and the like from the facility daily by various means as frequent removal does not allow the manure to ferment and cause an undesirable environment within the facility.

To this end, some facilities are provided with rotating mechanical augers or chain type drags in order to remove the manure from the floor, but these are very expensive and/or extremely high in maintenance costs and are therefore not particularly suited to relatively small facilities or for that matter, for use in larger facilities.

SUMMARY OF THE INVENTION

The present invention overcomes all of these disadvantages by providing, in the preferred embodiment, a central floor area which is circular and in which the floor surface slopes gradually towards a centrally located sump or pit which in turn may be connected to any form of disposal means desired.

A scraper assembly extends outwardly from a central pivot within this pit and includes a scraper blade which contacts the floor surface. The inner end of the scraper blade is offset from the central pivot and the blade, which may be straight or curved, lies at an angle across any particular radius extending from the central pivot to the outer periphery of the floor area so that the leading outer end is in advance of the trailing inner end. This, in conjunction with the inwardly sloping floor surface, causes any manure or debris scraped from the floor to be urged continuously towards the central sump or pit for easy removal in much the same way as an angled bulldozer blade operates.

An alternative embodiment, incorporates an annular sump or pit at the outer periphery of the floor surface under which circumstances the floor slopes outwardly and downwardly from the center towards this pit and the location of the scraper blade is reversed so that once again any manure or debris is urged outwardly towards the sump on a continuous basis as the scraper assembly is rotated by a convenient source of power.

Means are also provided so that the scraper blade or the scraper assembly is floating relative to the mounting thus facilitating the continuous contact of the blade with the floor surface regardless of any irregularities which may be present in the floor surface.

Another aspect of the present invention is to provide one or more spray nozzles for the scraper assembly so that water and/or disinfectant may be sprayed upon the floor surface as the scraper assembly is rotated.

One or more shoes or small wheels or rollers may be provided to mount the scraper assembly upon the floor surface, particularly if the length of the scraper assembly is relatively large.

The device is simple in operation, economical in manufacture and otherwise well suited to the purpose for which it is designed.

With the foregoing objects in view, and other such advantages and objects as will become apparent to those skilled in the art to which this invention relates as this specification proceeds, my invention consists essentially in the arrangement and construction of parts all as hereinafter more particularly described, reference being had to the accompanying drawings in which:

DESCRIPTION OF THE DRAWINGS

In the drawings like characters of reference indicate corresponding parts in the different figures.

DETAILED DESCRIPTION

Figure 1:
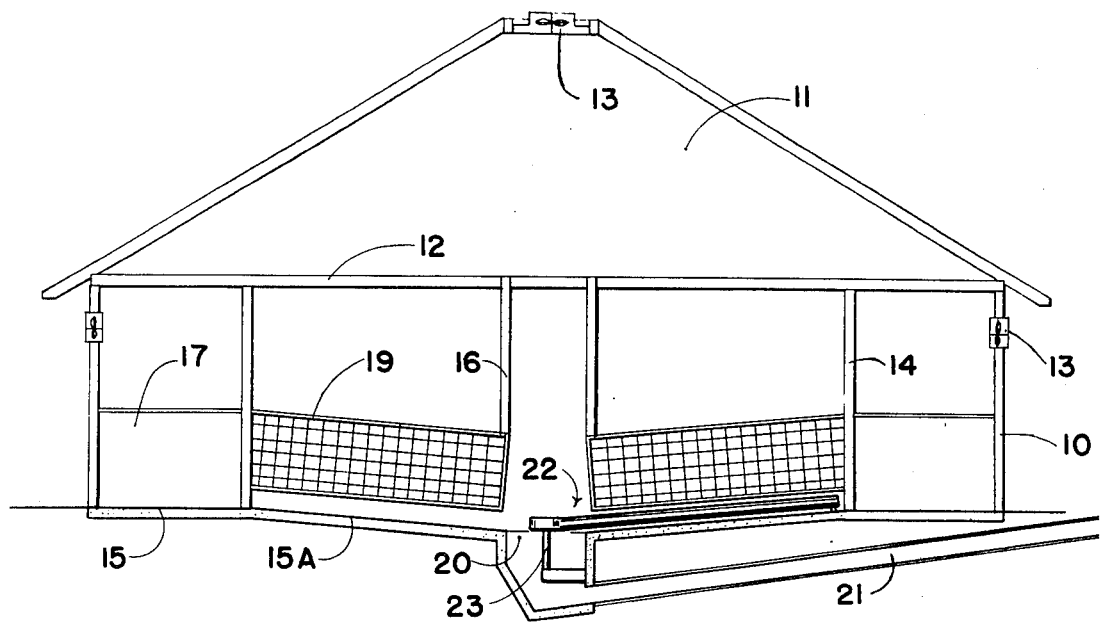
FIG. 1 is a partially schematic side sectional view of one embodiment of the device shown within an animal facility.

Proceeding therefore to describe the invention in detail, reference should first be made to FIG. 1 which shows, as an example only, a schematic view of a circular animal facility including the annular outer wall 10 with a substantially conical roof 11 supported thereby in conjunction with horizontal roof support members 12. An air ventilator 13 is provided in the apex of the roof and similar type ventilators 13 are provided within the annular outer wall 10.

A plurality of vertically situated ceiling supports 14 are provided extending around the facility inboard of the outer wall and extending between ceiling members 12 and a floor 15 and further vertical supports 16 depend downwardly from the horizontal members 12, inboard of the supports 14, said members 16 being situated adjacent the center of the circular facility.

Figure 2:
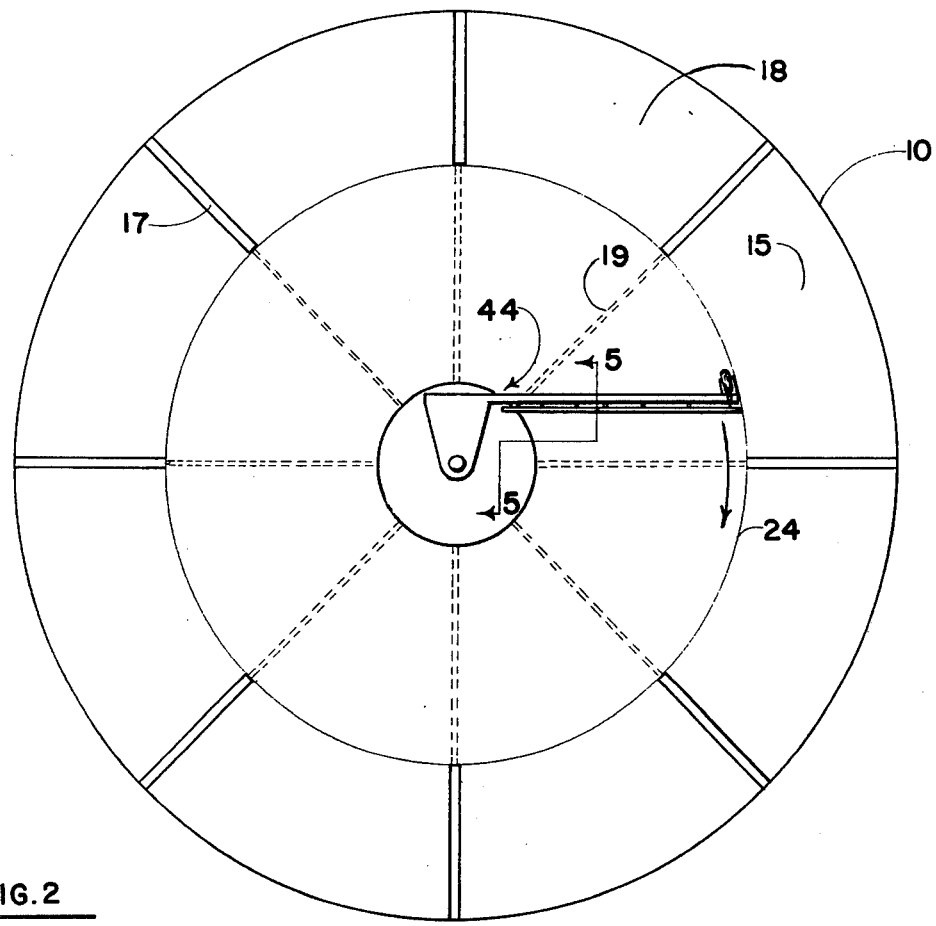
FIG. 2 is a schematic plan view of the inside of the facility shown in FIG. 1.

A plurality of partitions 17 extend radially inwardly from the outer wall to the outer ring of supports 14 thus providing a plurality of stalls 18 (see FIG. 2). Partition sections 19 extend between the vertical supports 14 and the vertical supports 16, as a continuation of the partitions set 17, but these partitions 19 are raised above the floor 15A as clearly shown in FIG. 1. These partitions 19 may also be in the form of gratings as illustrated, as desired.

Although the outer floor surface 15 preferably slopes inwardly slightly, nevertheless the circular floor area 15A below the partitions 19, slopes downwardly towards a common centrally located sump or pit 20 situated centrally of the facility in this particular embodiment.

This sump connects to a discharge pipe 21 and any material within the sump may be passed through the discharge pump 21 either by gravity or by any other well known means.

A scraper assembly collectively designated 22 is mounted for rotation upon a spindle 23 located centrally of the sump 20 and is adapted to rotate in substantial contact with the floor area 15A, passing below the underside edges of the partitions 19 and details of this scraper assembly will hereinafter be described.

Reference to FIG. 2 shows a schematic plan view of the floor area of the animal facility previously described and illustrated in FIG. 1.

Alternatively, the sump may take the form of an annular trough shown in phantom in FIG. 2 and identified by reference character 24 and this annular trough is situated adjacent the outer ends of the partitions 19 just inboard of the vertical supports 14.

Under these circumstances, the floor surface 15A slopes downwardly and outwardly from the center thereof so that debris, liquids and the like may flow outwardly to the annular sump 24 rather than inwardly towards the sump 20 as in FIG. 1. Not shown, is a discharge pipe for the annular trough 24, but this may take the similar form to discharge pipe 21 illustrated in FIG. 1.

Dealing first with the scraper assembly 22 shown in FIG. 5, this particular embodiment consists of a sleeve bearing 25 secured for rotation with the vertical spindle 23 which may be mounted in various bearings 26 situated below the floor surface.

Reference character 27 illustrates schematically, a below floor pit within which a source of power 28 may be provided, which, in this embodiment, takes the form of an electric motor. Gears 29 rotate a stub shaft 30 supported within bearings 31 and sprocket chain 32 connects a gear 33 secured to shaft 30, to a further sprocket 34 which in turn is secured to the aforementioned shaft 23. This provides rotation for shaft 23, but of course any other convenient form of power can be utilized. Needless to say it may be desirable to use a ratchet type or other mechanical drive on the outer end of the scraper blade.

The scraper assembly 22 includes a boom 35 which in this particular embodiment, is tubular and may be supported at intervals along the length thereof by means of small wheels or rollers 36 secured thereto upon brackets 37 and mounted upon shaft 38. Alternatively, shoes (not illustrated) may be utilized.

Figure 7:
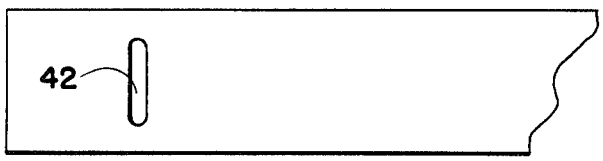
FIG. 7 is an enlarged fragmentary front elevation of one of the scraper blades.

This boom is supported in an offset relationship from the bearing mounting 25, by means of a bracket 39 and a scraper blade assembly 40 is secured to the boom by means of nut and bolt assemblies 41 extending through the wall of tube 35 and through the scraper blade or blades 40. In the embodiment shown in FIGS. 5, 7 and 8, these scraper blades are provided with vertically extending slots 42 through which nut and bolt assemblies 41 extend thus permitting the blade or blade sections (see FIG. 8) to float relative to the boom 35 so that they maintain substantial contact with the floor surface despite any irregularities that might be present within the floor surface.

Figure 6:
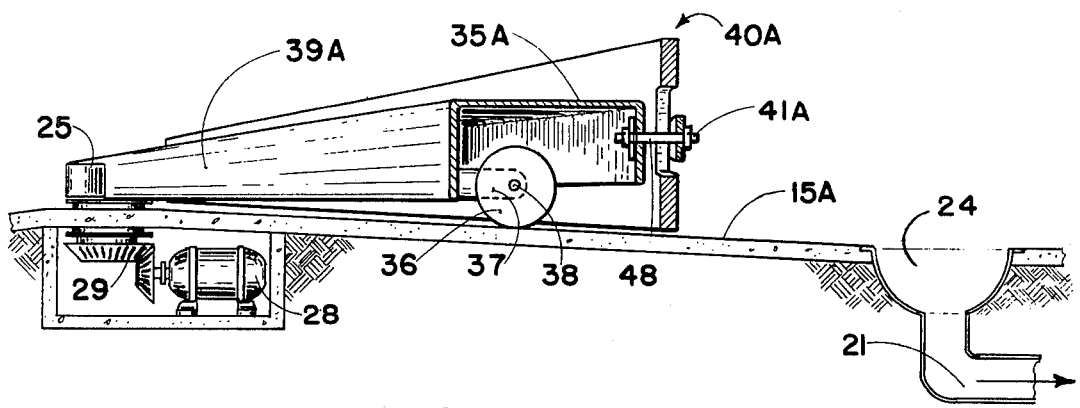
FIG. 6 shows an alternative construction of FIG. 5 and also shows the alternative embodiment of the floor and collecting sump.

Alternatively, of course, the entire scraper blade assembly may be mounted for floating movement by means of a pivotal connection 43 between the scraper assembly and the bearing support tube as for example, illustrated in FIG. 6.

Figure 4:
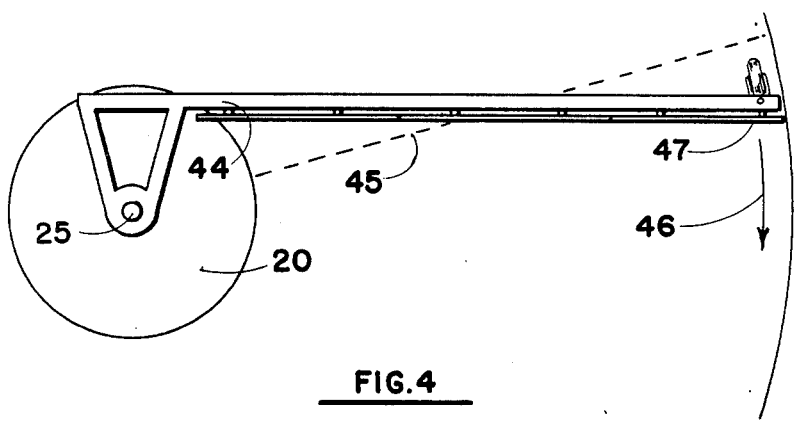
FIG. 4 is a view similar to FIG. 3, but showing an alternative embodiment of a scraper assembly.
Figure 5:
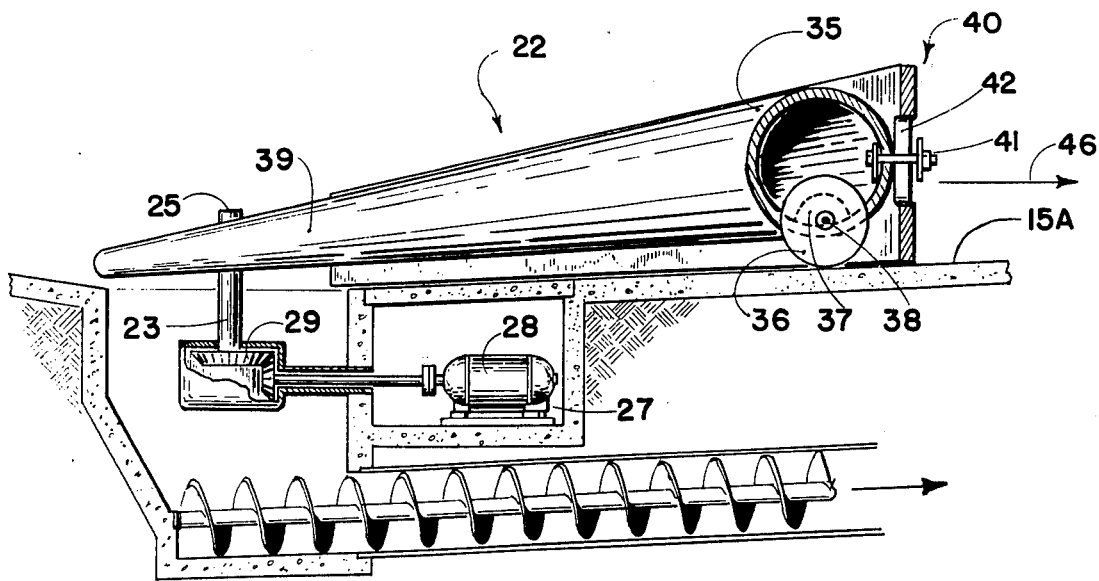
FIG. 5 is a partially schematic end elevation of the scraper assembly shown in FIG. 2, taken along the line 5—5 of FIG. 2.

The boom and scraper blade may be straight as illustrated in FIG. 4 or arcuately curved as illustrated in FIG. 5. In any event, the inner ends 44 are secured to the central pivot via the bearing assembly 25, in an offset manner and extend outwardly towards the outer periphery of the floor area swept thereby, so that they cut any radius line 45, at an angle.

Figure 3:
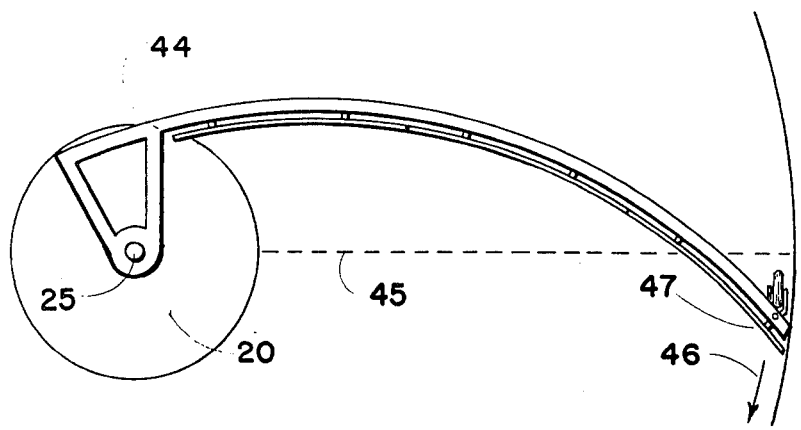
FIG. 3 is a top plan schematic view showing one embodiment of a scraper assembly.

In FIGS. 3 and 4, with the scraper assembly rotating in the direction of arrows 46, the outer end 47 of the scraper blade is in advance of the inner end 44 thus cutting the radius line 45 as clearly shown so that the scraper blade continuously urges any material or manure scraped from the floor surface, inwardly towards the centrally located sump or pit 20 aided by the inwardly sloping surface of the conical floor area swept by the scraper assembly, in much the same way as a bulldozer blade urges material to one side when it is angled relative to the direction of travel.

FIG. 6 shows the alternative embodiment in which the sloping floor area 15A slopes downwardly and outwardly from the center towards the annularly situated sump 24.

However, the operation is similar with the exception that the direction of rotation would be reversed from that shown in FIGS. 3 and 4 so that the inner end is in advance of the outer end 47, but once again the scraper blade crosses the radial line 45 at an angle.

In FIG. 6, a channel shaped member 35A acts as a boom with the scraper blade 40A being secured to the outer vertical flange 48 by means of nut and bolt assemblies 41A.

Solid lines show the connection of the boom to the sleeve 25 but dotted lines show a method of pivotally securing bracket 39A to the sleeve 25 by means of aforementioned pivot 43.

Figure 8:
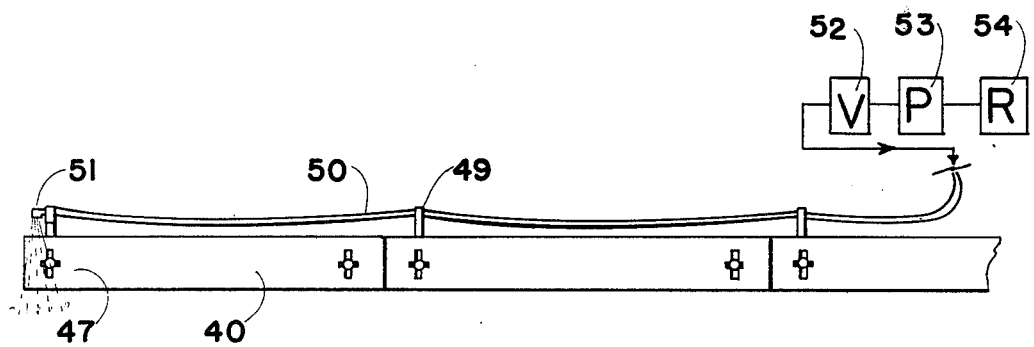
FIG. 8 is a fragmentary side elevation of a plurality of scraper blades also including one embodiment of a spray nozzle assembly.

FIG. 8 shows a plurality of scraper blades 40 used particularly where the diameter of the floor area is relatively large. This allows individual floating movement over the entire floor area and ensures good cleaning contact with the floor surface.

FIG. 8 also shows an embodiment where a plurality of brackets 49 carry a flexible hose 50 which is connected to a spray nozzle assembly 51 adjacent the outer end 47 of the scraper assembly.

The inner end of the hose is connected to a valve assembly 52, to a fluid pump 53 and to a reservoir 54, all of which are shown schematically in FIG. 8.

Water and/or disinfectant may therefore be pumped to the outer end of the scraper assembly when used in the embodiment illustrated in FIG. 1 or 5, or to the inner end of the scraper assembly when used in the embodiment illustrated in FIG. 6. In any event, this facilitates the cleaning of the floor surface and assists in maintaining same in a clean and sanitary condition.

Since various modifications can be made in my invention as hereinabove described, and many apparently widely different embodiments of same made within the spirit and scope of the claims without departing from such spirit and scope, it is intended that all matter contained in the accompanying specification shall be interpreted as illustrative only and not in a limiting sense.

What I claim as my invention is:

1. In an animal facility which includes a circular floor area and a source of power, a clean out assembly for said circular floor area, a collecting sump for said floor area, the surface of said floor area sloping towards said sump so that a cross sectional view of said floor area is conical, a scraper assembly for said circular floor area, means mounting said scraper assembly centrally of said floor area for rotation around said floor area, said scraper assembly including a scraper blade substantially in contact with the surface of said floor area for scraping material from the surface of said floor area, said scraper blade crossing a radius line extending from the center of said floor area at an angle thereby urging material scraped from the floor by said scraper, towards said sump, and means to mount said scraper assembly in floating relationship with said floor surface whereby said scraper blade is maintained in substantial contact with said floor surface.

2. The device according to claim 1 in which said sump is situated centrally of said floor area surrounding said means mounting said scraper assembly, said surface of said floor area sloping downwardly and inwardly from the outer periphery thereof towards said sump.

3. The device according to claims 2 in which said scraper blade is arcuately curved with the outer end being situated in advance of the inner end relative to said means to mount said scraper assembly, with the concave side of said scraper blade forming the leading edge thereof when rotating.

4. The device according to claim 2 which includes a spray nozzle assembly situated on said scraper assembly adjacent the outer end thereof.

5. The device according to claim 1 in which said sump is situated centrally around the periphery of said floor area in the form of an annular trough, said surface of said floor area sloping outwardly and downwardly from the center thereof towards said annularly situated sump.

6. The device according to claim 5 in which said scraper blade is arcuately curved with the inner end thereof being situated in advance of the outer end relative to said means to mount said scraper assembly, with the convex side of said scraper blade forming the leading edge of said scraper assembly when rotating.

7. The device according to claim 5 which includes a spray nozzle assembly situated on said scraper assembly adjacent the inner end thereof.

8. The device according to claim 1 which includes means to support said scraper assembly outboard of said means for mounting said scraper centrally of said floor area.

9. The device according to claim 8 in which said sump is situated centrally of said floor area surrounding said means mounting said scraper assembly, said surface of said floor area sloping downwardly and inwardly from the outer periphery thereof towards said sump.

10. The device according to claim 9 in which said scraper blade is arcuately curved with the outer end being situated in advance of the inner end relative to said means to mount said scraper assembly, with the concave side of said scraper blade forming the leading edge thereof when rotating.

11. The device according to claim 8 in which said sump is situated centrally around the periphery of said floor area in the form of an annular trough, said surface of said floor area sloping outwardly and downwardly from the center thereof towards said annularly situated sump.

12. The device according to claim 11 in which said scraper blade is arcuately curved with the outer end being situated in advance of the inner end relative to said means to mount said scraper assembly, with the concave side of said scraper blade forming the leading edge thereof when rotating.

13. In an animal facility which includes a circular floor area and a source of power, a clean out assembly for said circular floor area, a collecting sump for said floor area, the surface of said floor area sloping towards said sump so that a cross sectional view of said floor area is conical, a scraper assembly for said circular floor area, means mounting said scraper assembly centrally of said floor area for rotation around said floor area, said scraper assembly including a scraper blade substantially in contact with the surface of said floor area for scraping material from the surface of said floor area, said scraper blade crossing a radius line extending from the center of said floor area at an angle thereby urging material scraped from the floor by said scraper, towards said sump, said scraper assembly including a boom, said scraper blade being mounted to said boom and substantially parallel thereto, said means mounting said scraper assembly including a pivot assembly mounted centrally of said circular floor area, said boom being secured by the inner end thereof to said pivot assembly but offset therefrom.

14. The device according to claim 13 which includes means to mount said scraper assembly in floating relationship with said floor surface whereby said scraper blade is maintained in substantial contact with said floor surface.

15. The device according to claim 14 in which said sump is situated centrally of said floor area surrounding said means mounting said scraper assembly, said surface of said floor area sloping downwardly and inwardly from the outer periphery thereof towards said sump.

16. The device according to claim 15 in which said scraper blade is arcuately curved with the outer end being situated in advance of the inner end relative to said means to mount said scraper assembly, with the concave side of said scraper blade forming the leading edge thereof when rotating.

17. The device according to claim 14 in which said sump is situated centrally around the periphery of said floor area in the form of an annular trough, said surface of said floor area sloping outwardly and downwardly from the center thereof towards said annularly situated sump.

18. The device according to claim 17 in which said scraper blade is arcuately curved with the outer end being situated in advance of the inner end relative to said means to mount said scraper assembly, with the concave side of said scraper blade forming the leading edge thereof when rotating.

19. The device according to claim 13 in which said sump is situated centrally of said floor area surrounding said means mounting said scraper assembly, said surface of said floor area sloping downwardly and inwardly from the outer periphery thereof towards said sump.

20. The device according to claim 19 in which said scraper blade is arcuately curved with the outer end being situated in advance of the inner end relative to said means to mount said scraper assembly, with the concave side of said scraper blade forming the leading edge thereof when rotating.

21. The device according to claim 13 in which said sump is situated centrally around the periphery of said floor area in the form of an annular trough, said surface of said floor area sloping outwardly and downwardly from the center thereof towards said annularly situated sump.

22. The device according to claim 21 in which said scraper blade is arcuately curved with the outer end being situated in advance of the inner end relative to said means to mount said scraper assembly, with the concave side of said scraper blade forming the leading edge thereof when rotating.

23. The device according to claim 13 which includes means to support said scraper assembly outboard of said means for mounting said scraper centrally of said floor area.

24. The device according to claim 23 in which said sump is situated centrally of said floor area surrounding said means mounting said scraper assembly, said surface of said floor area sloping downwardly and inwardly from the outer periphery thereof towards said sump.

25. The device according to claim 24 in which said scraper blade is arcuately curved with the outer end being situated in advance of the inner end relative to said means to mount said scraper assembly, with the concave side of said scraper blade forming the leading edge thereof when rotating.

26. The device according to claim 23 in which said sump is situated centrally around the periphery of said floor area in the form of an annular trough, said surface of said floor area sloping outwardly and downwardly from the center thereof towards said annularly situated sump.

27. The device according to claim 26 in which said scraper blade is arcuately curved with the outer end being situated in advance of the inner end relative to said means to mount said scraper assembly, with the concave side of said scraper blade forming the leading edge thereof when rotating.

* * * * *